United States Patent [19]

Kurumaji et al.

[11] Patent Number: 4,589,839
[45] Date of Patent: May 20, 1986

[54] HOT RUNNERS FOR AN INJECTION MOLDING MACHINE

[75] Inventors: Masanobu Kurumaji; Tsutomu Sano; Hiroaki Kondo, all of Kobe; Masao Mizutani, Mie; Kazuei Yodono, Saitama, all of Japan

[73] Assignee: Kabushiki Kaisha Kobe Seiko Sho, Kobe, Japan

[21] Appl. No.: 650,541

[22] Filed: Sep. 14, 1984

[30] Foreign Application Priority Data

Sep. 16, 1983 [JP] Japan .................. 58-171758

[51] Int. Cl.$^4$ .............................. B29C 45/20
[52] U.S. Cl. .................. 425/547; 264/328.11; 425/568; 425/569; 425/571; 425/574
[58] Field of Search ............ 264/328.11; 425/542, 425/547, 567, 568, 569, 571, 574, 186, 190, 258

[56] References Cited

U.S. PATENT DOCUMENTS 3,464,091 9/1969 Bielfeldt .................. 425/574
3,667,884 6/1972 Reinfeld .................. 425/574

FOREIGN PATENT DOCUMENTS 50-66558 4/1975 Japan .

*Primary Examiner*—Jay H. Woo
*Assistant Examiner*—Timothy W. Heitbrink
*Attorney, Agent, or Firm*—Oblon, Fisher, Spivak, McClelland & Maier

[57] ABSTRACT

An injection molding machine is disclosed in which molten resin from an extruder is injected into the cavity of a mold through a nozzle. A runner body disposed between the mold and the extruder has a substantially L-shaped hot runner for supplying the molten resin from the extruder to the mold therethrough. The runner body is pivotably supported by a support assembly and is horizontally slidable relative to the support assembly to accommodate thermal expansion, whereby the nozzle mounted on the runner body can be brought into or out of intimate contact with the mold. To accommodate the thermal expansion of the runner body only toward the extruder, a stopper is provided on the base frame.

4 Claims, 6 Drawing Figures

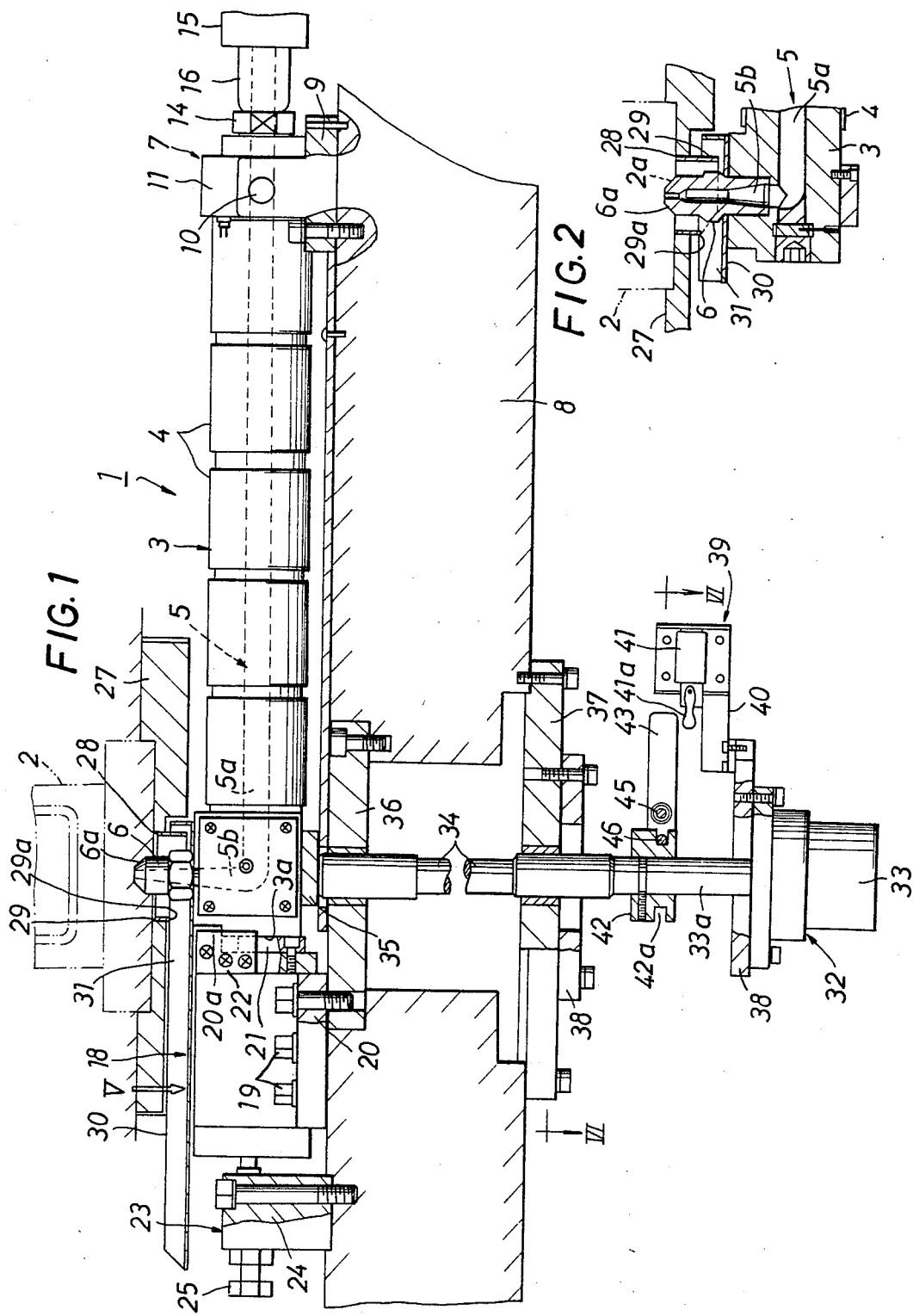

4,589,839

HOT RUNNERS FOR AN INJECTION MOLDING MACHINE

BACKGROUND OF THE INVENTION

1. Field of the Invention

The present invention is directed to the provision for hot runners for an injection molding machine.

2. Description of the Prior Art

Injection molding machines generally comprise a horizontal mold unit and a horizontal injection unit, or a vertical mold unit and a vertical injection unit. Some injection molding machines comprise a horizontal mold unit and a vertical injection unit, or a reverse combination.

With such machines, the runner within the mold is designed to have a minimized length to assure a smooth flow of the material. However, since the mold itself must be provided with a hot runner portion, there is a need to use a machine including the mold and hot runner portion and which is designed specifically in conformity with the shape of the desired molding. This entails an increased equipment cost and a reduced mold cooling efficiency.

To overcome the above problem, Published Unexamined Japanese Patent Application SHO No. 50-66558 discloses an injection molding machine comprising a mold and an L-shaped hot runner portion separate from the mold. A nozzle and a cylinder head constituting the hot runner portion are upwardly or downwardly movable for the nozzle to come into contact with the mold to supply a material to the mold cavity.

With this conventional arrangement, the cylinder head is connected directly to a plasticizing cylinder, which is pivoted at its base portion to effect the upward or downward movement for nozzle touching. Accordingly when the horizontal part of the hot runner portion thermally expands, the arrangement is unable to accommodate the expansion properly, permitting the nozzle to touch the mold at an improper position to result in a leak of material or produce a thermal stress.

SUMMARY OF THE INVENTION

The present invention relates to a hot runner for injection molding machines.

An object of the present invention is to provide a runner body formed with an L-shaped hot runner for use in injection molding machines, the runner body having an inlet end pivotably supported by a support assembly and slidable longitudinally of the runner body, whereby when the runner body thermally expands, the longitudinal expansion thereof can be accommodated to enable the nozzle to touch the mold accurately.

Another object of the present invention is to provide a runner body of the type described and formed with a hot runner, the runner body having a spherical portion which is formed at the inlet end slidably inserted through and supported by the support assembly and which is to be connected to an extruder, so that the runner body is made pivotally movable without restraint to permit the nozzle to touch the mold accurately.

Another object of the present invention is to provide a runner body having a hot runner and adapted for use in injection molding machines, the runner body being separate from but connectable to an extruder so as to be cleanable with ease and to cause the nozzle to touch the mold accurately with a reduced amount of force.

Still another object of the present invention is to provide a runner body having an L-shaped hot runner for injection molding machines, the runner body being connectable at its supported inlet end to the nozzle of an extruder to hold a horizontal portion of the runner in communication with the nozzle for supplying resin to the mold cavity, whereby the hot runner is made usable for vertical mold units and also for horizontal mold units alike.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is an overall frontal view partly in section and showing an injection molding machine embodying the invention;

FIG. 2 is a sectional view showing a nozzle as attached to a runner body;

DETAILED DESCRIPTION OF THE PREFERRED EMBODIMENTS

Figure 3:
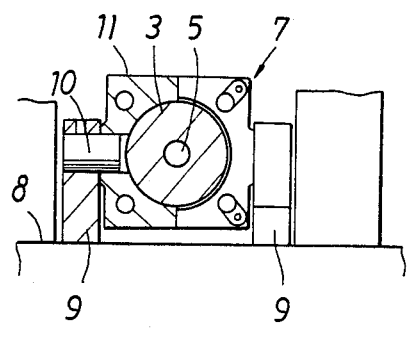
FIG. 3 is a side elevational view partly in section and showing a support assembly.

FIG. 1 shows an injection molding machine embodying the invention and comprising an injection unit 1 and a vertical mold unit including a mold 2. The injection unit 1 is disposed under the mold 2 according to the present embodiment.

The injection unit 1 comprises a runner body 3 and an extruder 15. The runner body 3 is supported substantially horizontally by a support assembly 7 on a base frame 8.

The material from the extruder 15 is injected into the cavity of the mold 2 through a nozzle 6. The runner body 3 is disposed between the extruder 15 and the mold 2.

The runner body 3 is hollow, cylindrical, and is covered with a heating means 4 comprising a number of band heaters and has a hot runner 5 in its interior.

The hot runner 5 is L-shaped and comprises a horizontal channel 5a and a vertical channel 5b. The horizontal channel 5a extends longitudinally of the runner body 3 coaxially therewith. The vertical channel 5b is formed at one end of the horizontal channel 5a substantially at a right angle therewith and communicates with the channel 5a.

As seen in FIG. 2, the nozzle 6 is screwed in the outer end of the vertical channel 5b in communication therewith. The tip 6a of the nozzle is movable into or out of intimate contact with a touching portion 2a of the mold 2.

The runner body 3 has an inlet end adjacent to the extruder 15 and is supported by the support assembly 7 pivotally movably about a transverse axis and slidably longitudinally of the body 3.

Figure 4:
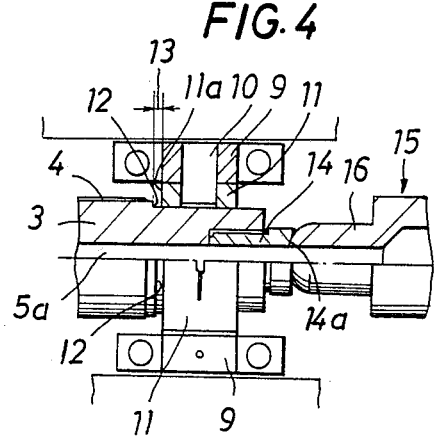
FIG. 4 is a plan view partly in section and showing the support assembly.

With reference to FIGS. 3 and 4, the support assembly 7 comprises a pair of brackets 9 fixedly mounted on the base frame 8 by bolts or the like and horizontal pins 10 supported by the brackets 9. Trunnions 11 are rotatably fitted around and supported by the pins 10, and the inlet end of the runner body 3 is slidably inserted through the pair of trunnions 11.

Accordingly the runner body 3 is pivotally movable upward or downward about the pins 10 to render the nozzle 6 movable into or out of intimate contact with the mold 2. The runner body 3, which is not fixed to the trunnions 11, has a stepped portion 12 which is spaced longitudinally of the body 3 from the inner end faces 11a of the trunnions by a clearance 13 as seen in FIG. 4. Thus, the runner body 3 is slidable until the stepped portion 12 comes into contact with the end faces 11a, whereby the runner body 3 is allowed to thermally expand longitudinally thereof when the nozzle carrying outlet end thereof is restrained in position.

A nozzle adaptor 14 is removably screwed in the inlet end of the runner body 3. The outer end of the adaptor 14 has a spherical (concave) surface 14a. The extruder 15, serving as a plasticizing cylinder, has a nozzle 16 bearing against the spherical surface 14a.

Although not shown, the overall extruder 15 or the nozzle 16 alone is slidable in the direction of extrusion of the resin material. The nozzle 16 supplies the resin material to the horizontal portion 5a of the hot runner 5 through the nozzle adaptor 14. The nozzle 16 and the adaptor 14 are turnable relative to each other by virtue of provision of the spherical surface 14a and are joined together so as not to separate from each other.

The runner body 3 is held pressed toward its outlet end by the extruder 15. To limit the movement of the runner body 3 due to this pressure, the outlet end of the runner body 3 is provided with stopper means 18.

Figure 5:
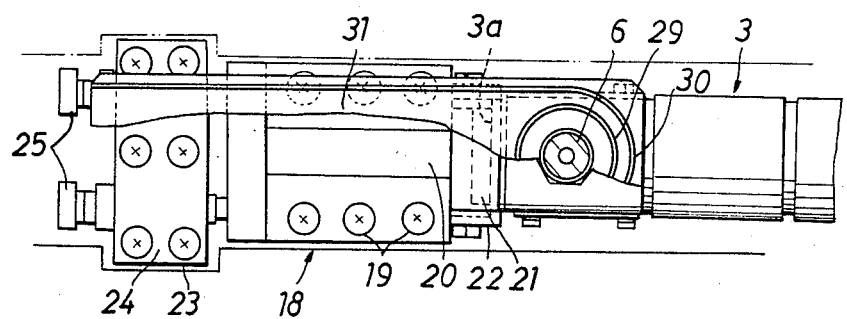
FIG. 5 is a view showing part of the machine as it is seen in the direction of arrow V in FIG. 1.

The stopper means 18 comprises a block 20 removably fixed to the base frame 8 by bolts 19 and a stopper plate 21 secured to the block 20 as shown in FIGS. 1 and 5. A guide plate 22 is attached to each of the front and rear ends of the stopper plate 21.

FIG. 1 shows the runner body 3 in an injection position, with the nozzle 6 in contact with the touching portion 2a of the mold 2. With the outlet end face 3a of the runner body 3 bearing against the stopper plate 21, the runner body 3, which is thus restrained by the stopper plate 21, thermally expands toward the extruder 15 within the range of the clearance 13 shown in FIG. 4. Consequently the position of the nozzle 6 remains substantially unchanged, permitting the supply of molten resin material to the mold cavity via the nozzle 6.

Upward or downward movement of the runner body 3 is guided by the guide plates 22, and the upward movement thereof is limited by a projection 20a on the block 20.

The stopper means 18 is adapted to adjust the position of the nozzle 16 by a position adjusting assembly 23. With reference to FIGS. 1 and 5, the position adjusting assembly 23 comprises a base block 24 removably fixed to the base frame 8 by bolts and two set bolts 25 horizontally inserted through the base block 24 in screw-thread engagement therewith. The inserted ends of the set bolts 25 bear against the block 20.

Accordingly the position of the stopper plate 21, i.e. the position of the nozzle 16, is adjustable within the range of play of the block 20 relative to the bolts 19 inserted through the holes therein, by loosening the bolts 19 and advancing or retracting the set bolts 25.

The mold 2 comprises an upper mold segment and a lower mold segment. The lower mold segment is mounted on a stationary backing plate 27 which is centrally formed with a nozzle inserting opening 28. A hollow cylindrical member 29 having a cutout 29a is fitted in the opening 28.

A runner forming member 30 is disposed between the backing plate 27, and the runner body 3 and the stopper means 18. The runner forming member 30 is provided by welding a strip, U-shaped when seen from above, to a horizontal flat plate as seen in FIG. 5 and has a horizontal runner 31. The curved portion of the U-shaped strip is positioned outside the hollow cylindrical member 29.

Accordingly the cutout 29a in the hollow cylindrical member 29 communicates with the runner 31 of the member 30, whereby the resin material leaking from the nozzle tip 6a is prevented from flowing toward the heater means 4, guided out of the injection unit and made easy to remove by cleaning. Moreover, the leak, when recognized from outside, indicates that the mold cavity has been filled with the molten resin.

The nozzle 6 on the runner body 3 is pressed against the touching portion 2a of the mold 2, while the runner body 3 pivotally moves about the pins 10 under gravity to move the nozzle 6 out of contact with the touching portion 2a. At this time, the runner body 3 is allowed to pivotally move out of alignment with the nozzle 16 of the extruder 15 by the spherical surface 14a.

Pressing means 32 provides a force for causing the nozzle 6 to touch the mold 2. According to the present embodiment, the pressing means 32 comprises a hydraulic (e.g. oil-pressure or water-pressure) cylinder 33 having a piston rod 33a, and a push rod 34 connected directly to the piston rod 33a or bearing against the rod 33a coaxially therewith. The free end of the push rod 34 bears against a contact plate 35 attached to the bottom of the runner body 3.

According to the present embodiment, therefore, the piston rod 33a, when advanced, pushes up the runner body 3 as supported by the pins 10, bringing the nozzle 6 into intimate contact with the touching portion 2a of the mold 2.

The pressing means 32, which is separate from the runner body 3, is less susceptible to thermal expansion. Insofar as this is realized, means in the form of a spring, screw or cam may be used in place of the illustrated means of the cylinder.

With the illustrated pressing means 32, an upper plate 36 and a bottom plate 37 respectively fixed to the upper and lower sides of the base frame 8 by bolts slidably support the push rod 34 through bushes.

The bottom plate 37 is fixedly provided with a box-shaped frame 38, to which the hydraulic cylinder 33 is attached. Provided inside the frame 38 is a control assembly 39 for a control valve (not shown) for the hydraulic cylinder 33.

Figure 6:
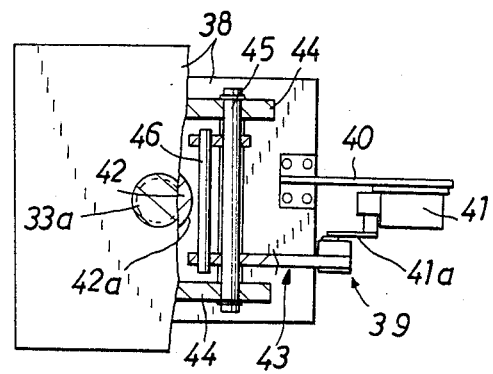
FIG. 6 is a view in section taken along the line VI—VI in FIG. 1.

With reference to FIGS. 1 and 6, the control assembly 39 comprises a sensor 41, such as a limit switch, supported by a bracket 40 on the frame 38, an actuator ring 42 fixedly fitted around the piston rod 33a and having an annular groove 42a, and an actuator 43 pivotably supported by a lateral rod 45 on brackets 44. The actuator 43 is provided at its one end with a pin 46 inserted in the annular groove 42a. The sensor 41 has an operating piece 41a which can be actuated by the other end of the actuator 43 when the actuator is moved upward or downward.

When the piston rod 33a and the push rod 34 are advanced by the operation of the hydraulic cylinder 33 to raise the runner body 3 through the contact plate 35, the nozzle 6 comes into contact with the mold 2, whereupon the actuator 43 operates the sensor 41. Thus the sensor 41 detects the contact of the nozzle 6 with the mold 2. The sensor 41 is also usable for detecting the disengagement of the nozzle 6 from the mold 2 when the mold is to be replaced.

According to the present invention described above in detail, the runner body 3 having the L-shaped hot runner 5 is restrained at its one end from moving longitudinally thereof by the stopper means 18 and is supported at the other end thereof toward the extruder 15 by the support assembly 7 pivotally movably and longitudinally slidably, so that even when the runner body 3 is longitudinally expanded by the heat of the heater means 4 during injection molding opereation, the runner body slides only relative to the support assemby 7, with the nozzle 6 being allowed to touch the mold properly in position, without abnormal leakage of the material or occurrence of thermal stress.

Because the runner body 3 and the extruder 15 are separate and are adapted to communicate with each other by the connecting means 14, 16 for the passage of material, the nozzle 6 can be pressed into contact with the mold 2 more smoothly and easily and with a smaller amount of force given by the pressing means 32 than when they are united. Moreover the nozzle touching force can be maintained at a constant value to assure accurate injection molding.

Furthermore, the arrangement wherein the runner body 3 is separate from the extruder 15 renders the interior of the runner body 3 easily cleanable and achieves an improved yield.

Although the present invention has been described and illustrated only with reference to the combination of a vertical mold unit and a horizontal injection unit, the present invention, which provides a runner body having a hot runner, is readily applicable also to horizontal mold units.

For example, the machine shown in FIG. 1 can be construed as being shown in a plan view. In this case, the push rod 34 is pivotally connected to the runner body 3, and the runner forming member 30 is made tubular.

Obviously, numerous modifications and variations of the present invention are possible in light of the above teachings. It is therefore to be understood that within the scope of the appended claims, the invention may be practiced otherwise than as specifically described herein.

What is claimed is:
1. An injection molding machine, comprising:
a base frame;
an extruder which includes a first nozzle;
a runner body having a hot runner formed in an interior thereof, said runner body being disposed between the mold and the extruder and which further includes a second nozzle at an outlet end thereof, the hot runner being substantially L-shaped;
connecting means engaging said first nozzle wherein said hot runner further comprises a horizontal channel adapted to communicate with the extruder at an inlet end portion of the runner body via said connecting means and a vertical channel communicating with the horizontal channel substantially perpendicular thereto and having said second nozzle at an outlet end of the runner body;
a support assembly being mounted on said base frame and disposed toward the connecting means between the runner body and the extruder, the inlet end of the runner body being supported by the support assembly and pivotally and slidably longitudinally mounted thereon;
stopper means fixed to said base frame and provided at the outlet end of the runner body for withstanding the pressing force of the extruder and for positioning the first nozzle wherein the stopper means is movably mounted on said base frame;
means mounted on said base frame for adjusting the horizontal position of said stopper means and said first nozzle; and
nozzle pressing means for pressing said second nozzle against the mold.

2. An injection molding machine as defined in claim 1 wherein the support assembly further comprises at least one trunnion and at least one horizontal pin inserted into said trunnion, the trunnion being fitted around the runner body slidably longitudinally of the runner body, and the runner body having a stepped portion spaced longitudinally of the body from an inner end face of the trunnion by a clearance for permitting thermal expansion of the runner body by longitudinal sliding.

3. An injection molding machine as defined in claim 1 wherein the connecting means between the runner body and the extruder further comprises a contact member having a spherical surface for permitting pivotal movement of the runner body, and the support assembly on the base frame is positioned proximate the connecting means.

4. An injection molding machine as defined in claim 1 wherein the nozzle pressing means further comprises a hydraulic cylinder having a piston rod, and the piston rod has an extension end bearing against a contact plate attached to the runner body, the piston rod being forwardly movable to bring the nozzle into intimate contact with a nozzle touching portion of the mold, and wherein the nozzle pressing means further comprises control means for detecting contact of said second nozzle with the mold.

* * * * *